US012119502B2

(12) United States Patent
Chen et al.

(10) Patent No.: US 12,119,502 B2
(45) Date of Patent: Oct. 15, 2024

(54) BATTERY COLUMN, BATTERY MODULE, AND APPARATUS

(71) Applicant: CONTEMPORARY AMPEREX TECHNOLOGY (HONG KONG) LIMITED, Hong Kong (CN)

(72) Inventors: Xinxiang Chen, Ningde (CN); Yulian Zheng, Ningde (CN); Shoujun Huang, Ningde (CN); Huasheng Su, Ningde (CN); Xiang Li, Ningde (CN); Peng Wang, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 451 days.

(21) Appl. No.: 17/614,367

(22) PCT Filed: Nov. 13, 2020

(86) PCT No.: PCT/CN2020/128864
§ 371 (c)(1),
(2) Date: Nov. 25, 2021

(87) PCT Pub. No.: WO2021/098622
PCT Pub. Date: May 27, 2021

(65) Prior Publication Data
US 2022/0247018 A1    Aug. 4, 2022

(30) Foreign Application Priority Data
Nov. 20, 2019   (CN) .......................... 201922016091.9

(51) Int. Cl.
*H01M 50/121*   (2021.01)
*H01M 10/658*   (2014.01)
*H01M 50/209*   (2021.01)

(52) U.S. Cl.
CPC ....... *H01M 50/121* (2021.01); *H01M 10/658* (2015.04); *H01M 50/209* (2021.01); *H01M 2220/20* (2013.01)

(58) Field of Classification Search
CPC ............. H01M 50/121; H01M 50/209; H01M 10/658; H01M 2220/20
(Continued)

(56) References Cited

U.S. PATENT DOCUMENTS

2013/0337306 A1   12/2013   Han et al.
2017/0149041 A1*   5/2017   Chang ................... H01M 50/15
(Continued)

FOREIGN PATENT DOCUMENTS

CN   205609583 U   9/2016
CN   106450406 A   2/2017
(Continued)

OTHER PUBLICATIONS

Contemporary Amperex Technology Co., Limited, International Search Report, PCT/CN2020/128864, Feb. 18, 2021, 8 pgs.
(Continued)

*Primary Examiner* — James M Erwin
(74) *Attorney, Agent, or Firm* — Kilpatrick Townsend & Stockton LLP (57) ABSTRACT

Embodiments of this application provide a battery column, a battery module, and an apparatus. The battery column includes a housing, and first battery cells and second battery cells that are alternately distributed side by side along a first direction in the housing, where the first battery cell includes a first metal case and a first insulating film, the first metal case has two first side surfaces disposed opposite each other along the first direction, and the first insulating film covers
(Continued)

at least the two first side surfaces; and the second battery cell includes a second metal case, which is exposed in the housing.

19 Claims, 7 Drawing Sheets

(58) Field of Classification Search
USPC .......................................................... 429/163
See application file for complete search history.

(56) References Cited

U.S. PATENT DOCUMENTS

2019/0041953 A1\* 2/2019 Hijazi ................... G06F 1/3296
2019/0097202 A1\* 3/2019 Morone .............. H01M 50/583

FOREIGN PATENT DOCUMENTS

| CN | 106575721 A | 4/2017 |
| CN | 206657824 U | 11/2017 |
| CN | 109216594 A | 1/2019 |
| CN | 211265549 U | 8/2020 |
| JP | 2013114954 A | 6/2013 |

OTHER PUBLICATIONS

Notice of Grant of Utility Model Patent Rights received in the corresponding Chinese application 201922016091.9, issued on Jul. 9, 2020.
Extended European search report received in the corresponding European application 20889089.7, issued on Jun. 24, 2022.
Written Opinion of The International Searching Authority received in the corresponding international application PCT/ CN2020/ 128864, ailed on Feb. 18, 2021.

\* cited by examiner

BATTERY COLUMN, BATTERY MODULE, AND APPARATUS

This application is a United States National Stage Application filed under 35 U.S.C. § 371 of PCT Patent Application Serial No. PCT/CN2020/128864, entitled "BATTERY COLUMN, BATTERY MODULE, AND APPARATUS," filed Nov. 13, 2020, which claims priority to Chinese Patent Application No. 201922016091.9, filed with the China National Intellectual Property Administration on Nov. 20, 2019 and entitled "BATTERY COLUMN, BATTERY MODULE, AND APPARATUS", each of which is incorporated herein by reference in its entirety.

TECHNICAL FIELD

Implementations of this application relate to the field of energy storage devices, and in particular, to a battery column, a battery module, and an apparatus.

BACKGROUND

As a type of important energy storage device, lithium batteries have been widely used in automobiles, energy storage, consumer electronics, and other industries due to its advantages such as high energy density, large capacity, high power, and long life. As the application end has a growing requirement on performance of lithium batteries, the manufacturing end has adopted a variety of methods to improve space utilization and energy density of the batteries. However, the current method for grouping multiple cells in a battery column still cannot meet the energy density requirements.

Therefore, a new battery column, battery module, and apparatus are urgently needed.

SUMMARY

The embodiments of this application provide a battery column, a battery module, and an apparatus, to improve energy density of the battery column.

Certain embodiments of this application provide a battery column, including a housing, and first battery cells and second battery cells that are alternately distributed side by side along a first direction in the housing, where the first battery cell includes a first metal case and a first insulating film, the first metal case has two first side surfaces disposed opposite each other along the first direction, and the first insulating film covers at least the two first side surfaces; and the second battery cell includes a second metal case, which is exposed in the housing.

The first insulating film covers the first side surface, ensuring mutual insulation between the first battery cell and the second battery cell. The first battery cells and the second battery cells are alternately arranged side by side along the first direction, which can ensure mutual insulation between all battery cells in the battery column and save space in the housing, improving energy density of the battery column.

In an embodiment, the first metal case further includes two second side surfaces disposed opposite each other along a second direction, where the two second side surfaces are connected between the two first side surfaces, and the first insulating film covers at least part of the two second side surfaces.

The first insulating film partially covers the two second side surfaces, and the first insulating film covers the second side surface in various ways. In some embodiments, the first insulating film further includes a first wrapping portion covering at least part of the second side surface. The first wrapping portion with a width of 5 mm to 10 mm can meet the safe creepage distance requirements.

In an embodiment, the first metal case further includes a bottom surface connected between the two first side surfaces, and the first insulating film covers at least part of the bottom surface.

The first insulating film covers the bottom surface in various ways. In some embodiments, the first insulating film further includes a second wrapping portion covering at least part of the bottom surface. When an extension width of the second wrapping portion in the first direction is 5 mm to 10 mm, the first insulating film can meet the creepage distance requirements on the bottom surface.

In an embodiment, the first insulating film is made of a material selected from at least one of low density polyethylene (LDPE), high density polyethylene (HDPE), polypropylene (PP), polyethylene PE, polyethylene terephthalate (PET), polycarbonate (PC), and polyarylate.

The first insulating film is made of polyethylene terephthalate, so that the first insulating film has good flexibility and can be wrapped on the first metal case.

In an embodiment, the second metal case and the first insulating film are bonded to each other by using glue.

The glue is provided between the first insulating film and the second metal case, so that the first insulating film can be bonded to the outside of the second metal case by using glue, making relative positions of the first battery cell and the second battery cell stable.

In an embodiment, the battery column further includes a heat insulation pad, which is disposed between the first battery cell and the second battery cell that are adjacent to each other;
   the heat insulation pad and the second metal case are bonded to each other by using glue; or
   the heat insulation pad is in direct contact with the second metal case.

The heat insulation pad is provided to meet the requirements for heat insulation and also has a particular buffering effect.

In an embodiment, the housing includes two side plates disposed opposite each other along the second direction, the second direction intersects the first direction, the first battery cell and the second battery cell are disposed between the two side plates, the side plate is provided with a second insulating film on an inner surface facing toward the housing, and the second insulating film is an insulating film layer attached on the inner surface of the side plate, or an adhesive layer coated on the inner surface of the side plate; and
   the second metal case is directly connected to the second insulating film.

The side plate is provided with the second insulating film on the inner surface facing toward the housing, ensuring mutual insulation between the side plate and the first battery cell and the second battery cell, and further ensuring mutual insulation between the first battery cell, the second battery cell and the housing.

In an embodiment, the housing includes a base plate, where the base plate is provided with a third insulating film on an inner surface facing toward the housing, and the third insulating film is an insulating film layer attached on the inner surface of the base plate, or an adhesive layer coated on the inner surface of the base plate; and
   the second metal case is directly connected to the third insulating film.

The base plate is provided with the third insulating film on the inner surface facing toward the housing, ensuring mutual insulation between the base plate and the first battery cell and the second battery cell, and further ensuring mutual insulation between the first battery cell, the second battery cell and the housing.

Certain embodiments of this application provides a battery module, including the foregoing battery column.

The battery module is used to provide electrical energy. A drive motor is connected to wheels on a main body of a vehicle through a transmission mechanism to drive the vehicle to move.

Certain embodiments of this application provides an apparatus that uses a battery column as a power source, where the battery column is the foregoing battery column.

The embodiment of this application provides the apparatus that uses the battery column as the power source, where the apparatus may be, but is not limited to, a vehicle, a ship, or an aircraft.

The battery column according to the embodiment of this application includes a housing and first battery cells and second battery cells that are alternately distributed side by side in the housing. A first insulating film is disposed on a first metal case of the first battery cell, and covers two first side surfaces. The second battery cell includes a second metal case, which is exposed in the housing. The first insulating film covers the first side surface, ensuring mutual insulation between the first battery cell and the second battery cell. The first battery cells and the second battery cells are alternately arranged side by side along the first direction, ensuring mutual insulation between all battery cells in the battery column. Therefore, in the battery column according to the embodiments of this application, even if no insulating film is provided on the second metal case of the second battery cell, and the second metal case is exposed in the housing, the battery cells can still be insulated from each other, and space inside the housing can be saved, thereby improving energy density of the battery column.

BRIEF DESCRIPTION OF DRAWINGS

To describe the technical solutions in the embodiments of this application more clearly, the following briefly describes the accompanying drawings for describing the embodiments. Apparently, the accompanying drawings in the following description show some embodiments of this application, and a person of ordinary skill in the art may still derive other drawings from these accompanying drawings without creative efforts.

Other features, purposes and advantages of this application will become more apparent by reading the following detailed description of the non-limitative embodiments with reference to the accompanying drawings, where the same or similar reference signs indicate the same or similar features.

Reference signs are described as follows:
1. battery module; 2. vehicle body;
11. battery column; 12. box body; 121. upper box body; 122. lower box body;
100. first battery cell; 110. first metal case; 111. first side surface; 112. second side surface; 113. bottom surface; 120. first insulating film; 121. body portion; 122. first wrapping portion; 123. second wrapping portion; 130. first electrode unit; 140. first top cover assembly;
200. second battery cell; 210. second metal case; 220. second electrode unit; 230. second top cover assembly;
300. housing; 310. end plate; 320. side plate; 321. second insulating film; 330. band; 340. base plate; 341. third insulating film; 350. insulating plate;
400. heat insulation pad;
X. first direction; and
Y. second direction.

DESCRIPTION OF EMBODIMENTS

The features and example embodiments of various aspects of this application will be described in detail below. In the following detailed description, many specific details are presented for comprehensive understanding of this application. However, it is obvious to those skilled in the art that this application can be implemented without some of these specific details. The following descriptions of the embodiments are only to provide a better understanding for this application by showing examples of this application. In the accompanying drawings and description below, at least part of the well-known structures and technologies are not shown in order to avoid unnecessary ambiguity to this application; and the size of some structures may be exaggerated for clarity. In addition, the features, structures or characteristics described below may be combined in one or more embodiments in any suitable manner.

In the descriptions of this application, it should be noted that, unless otherwise specified, "plurality" means more than two; and orientations or position relationships indicated by the terms "up", "down", "left", "right", "inside", "outside", and the like are merely intended to simplify description of this application for a purpose of easy description, rather than indicating or implying that an apparatus or a part must have a particular direction or must be constructed and operated in a particular orientation. Therefore, this shall not be construed as any limitation on this application. In addition, the terms "first" and "second" are merely intended for a purpose of description, and shall not be understood as an indication or implication of relative importance.

The orientation words shown in the following description are all directions shown in the drawings, and are not limited to the specific structure of the embodiments of this application. In the descriptions of this application, it should be further noted that, unless otherwise specified and defined explicitly, the terms "mounted" and "connected" are to be interpreted broadly, for example, may be fixedly connected, or detachably connected, or integrally connected, and may be directly connected, or indirectly connected. A person of ordinary skill in the art can understand specific meanings of these terms in this application based on specific situations.

For better understanding of this application, the following describes in detail a battery column, a battery module, and an apparatus of the embodiments of this application with reference to FIG. 1 to FIG. 9.

Figure 1:
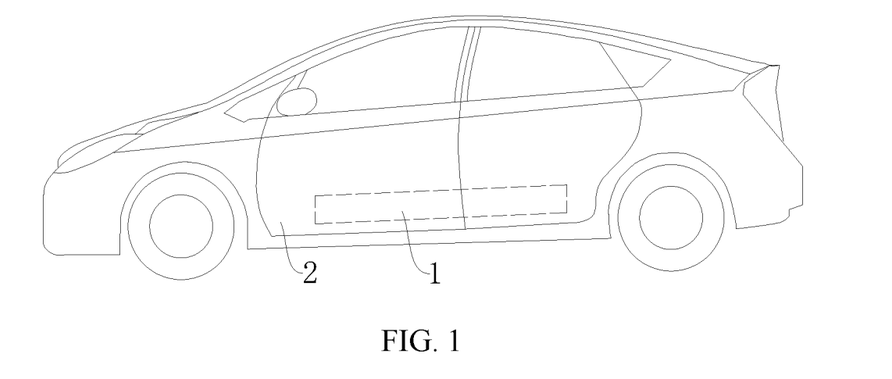
FIG. 1 is a schematic structural diagram of a vehicle according to an embodiment of this application.

As shown in FIG. 1, an embodiment of this application first provides a vehicle. The vehicle includes a vehicle body 2 and a battery module 1, and the battery module 1 is disposed in the vehicle body 2.

The vehicle is a new energy vehicle, which may be a battery electric vehicle, or may be a hybrid electric vehicle or an extended-range electric vehicle. The vehicle body 2 is provided with a drive motor. The drive motor is electrically connected to the battery module 1, and is provided with electrical energy by the battery module 1. The drive motor is connected to wheels on the vehicle body 2 through a transmission mechanism to drive the vehicle. For example, the battery module 1 may be horizontally disposed at the bottom of the vehicle body 2.

Figure 2:
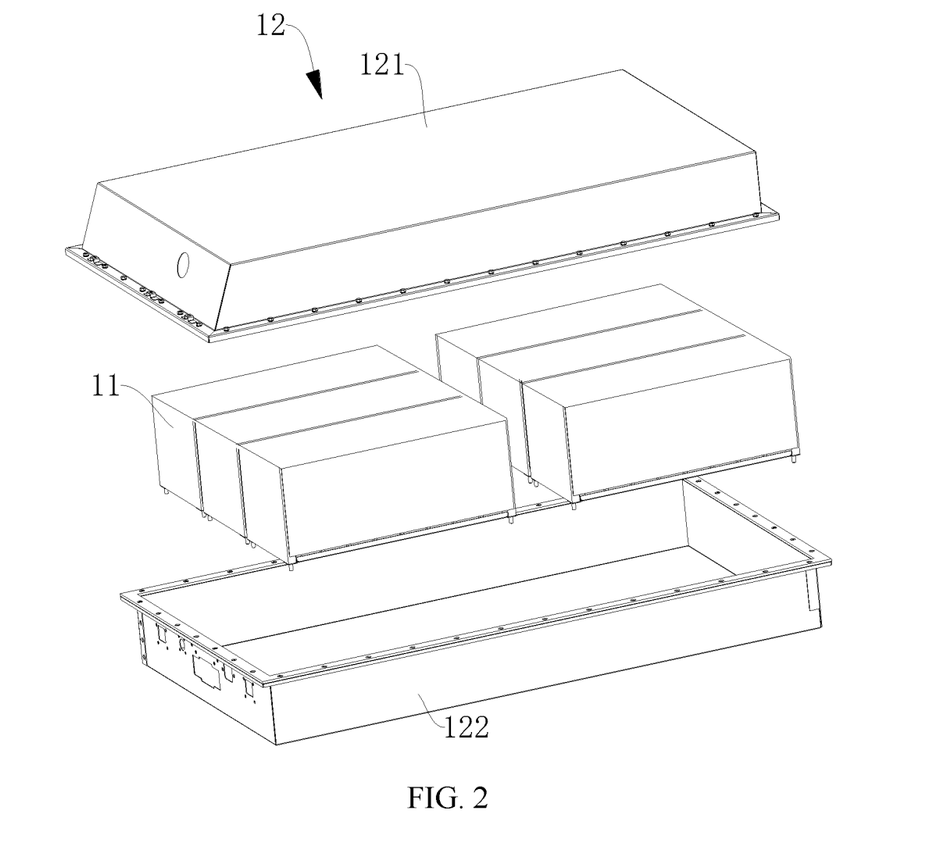
FIG. 2 is a schematic exploded view of a structure of a battery module according to an embodiment of this application.

Referring to FIG. 2, the battery module 1 can be disposed in various ways. In some embodiments, the battery module 1 includes a box body 12 and a battery column 11 disposed in the box body 12.

One or more battery columns 11 may be provided, and a plurality of battery columns 11 are disposed in a line in the box body 12. The box body 12 is not limited in its type and may be a frame-shaped, disk-shaped, or box-shaped box body, or the like. Specifically, the box body 12 may include a lower box body 122 for accommodating the battery column and an upper box body 121 that is engaged to the lower box body 122.

It can be understood that the battery column 11 can be used in vehicles and other apparatuses. An embodiment of this application further provides an apparatus that uses the battery column 11 as a power source, where the apparatus may be, but is not limited to, a vehicle, a ship, or an aircraft.

Figure 3:
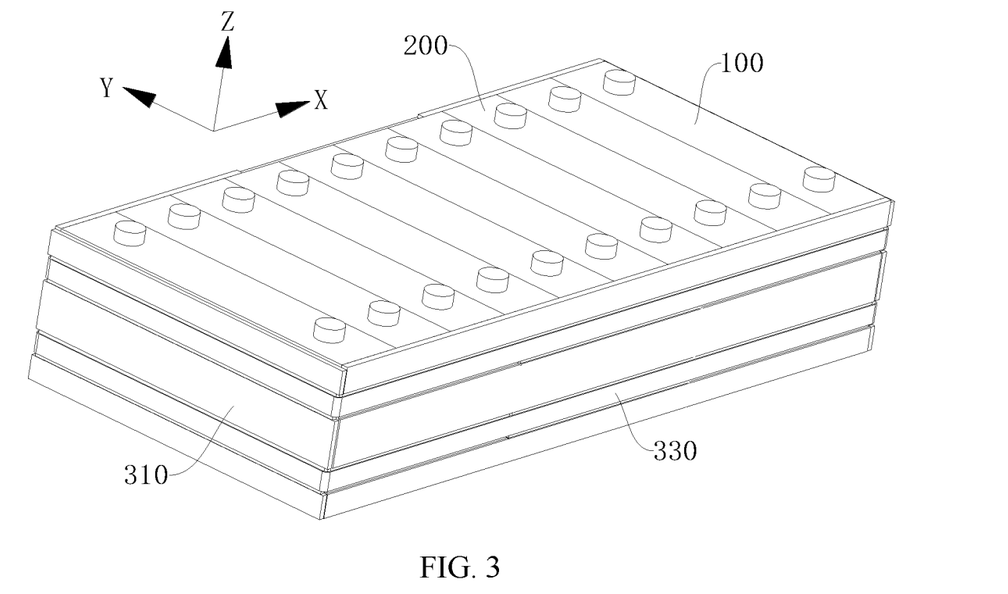
FIG. 3 is a schematic structural diagram of a battery column according to an embodiment of this application.
Figure 4:
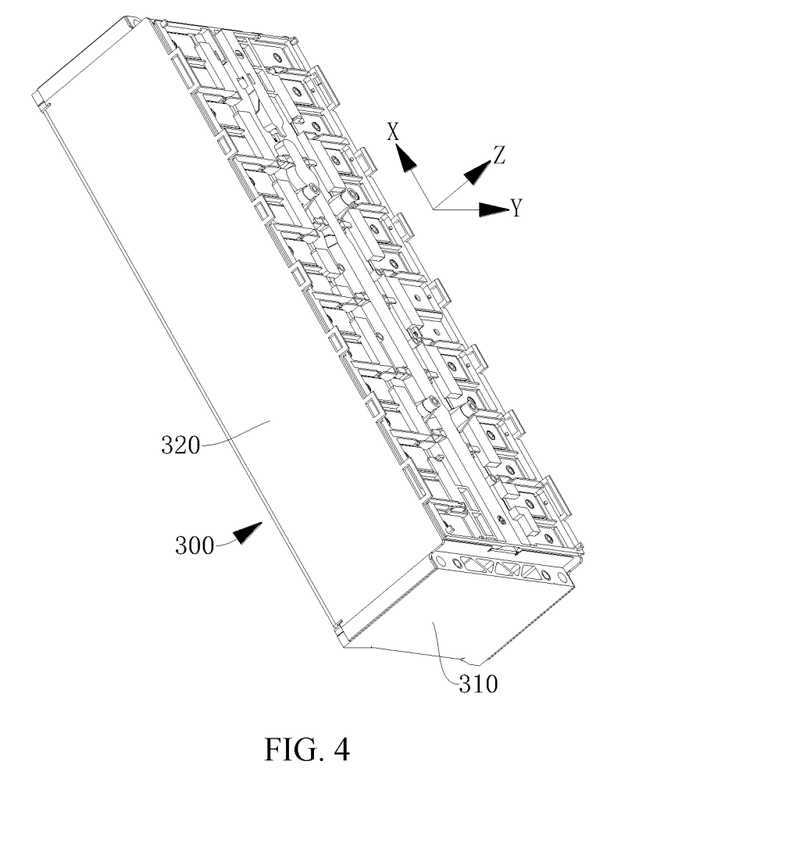
FIG. 4 is a schematic structural diagram of a battery column according to another embodiment of this application.
Figure 5:
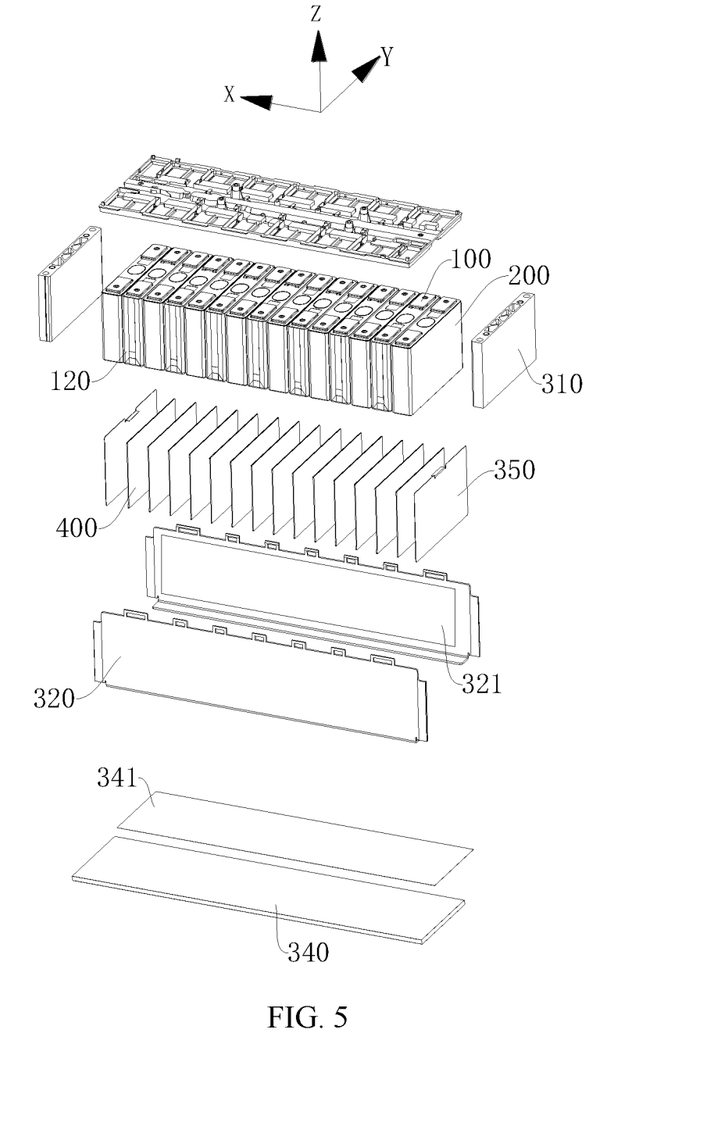
FIG. 5 is a schematic exploded view of the structure in FIG. 4.
Figure 6:
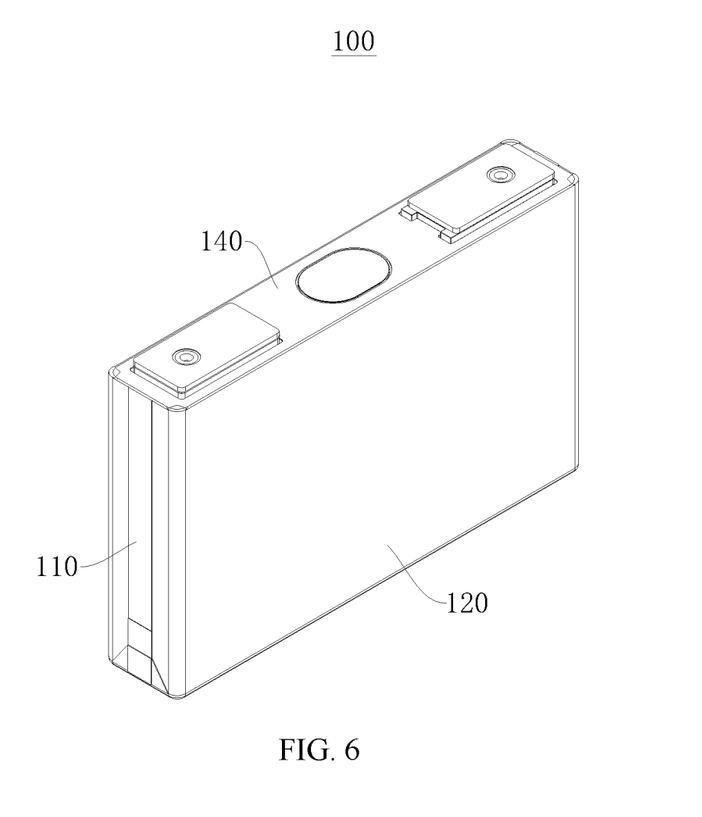
FIG. 6 is a schematic structural diagram of a first battery cell according to an embodiment of this application.
Figure 7:
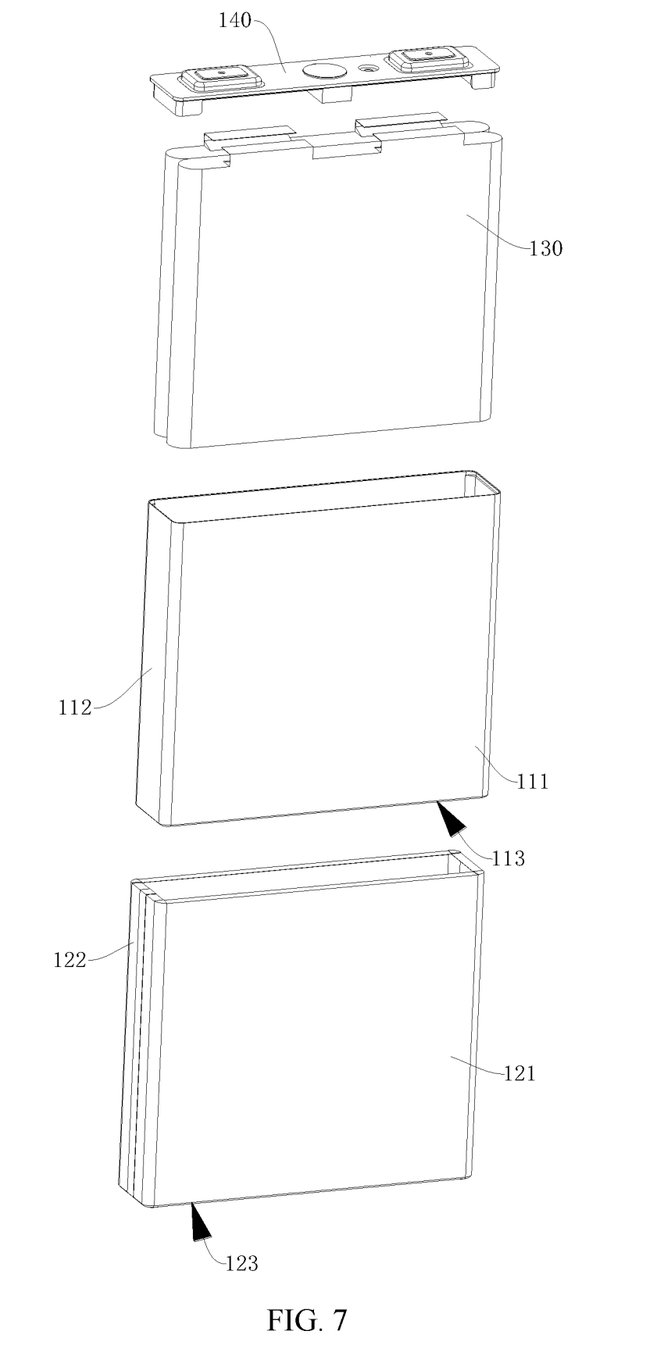
FIG. 7 is a schematic exploded view of the structure in FIG. 6.
Figure 8:
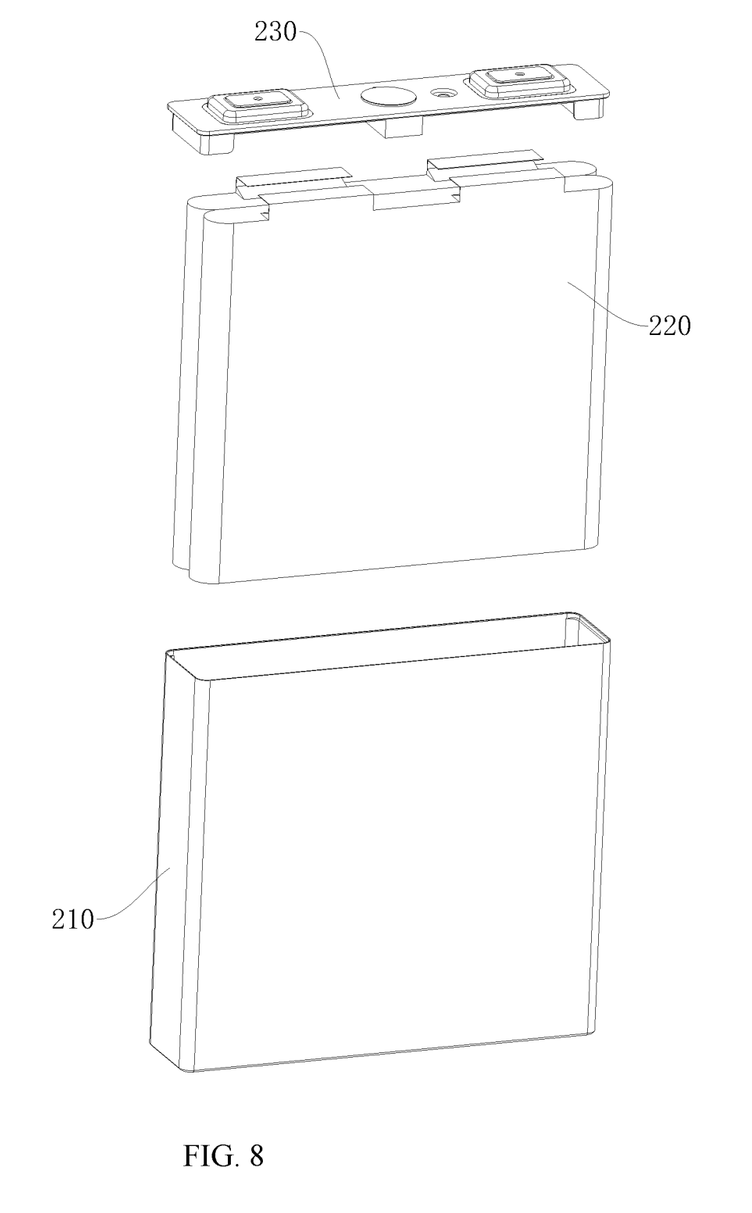
FIG. 8 is a schematic exploded view of a structure of a second battery cell according to an embodiment of this application.

Referring to FIG. 3 to FIG. 8, FIG. 3 is a schematic structural diagram of a battery column according to an embodiment of the application, FIG. 4 is a schematic structural diagram of a battery column according to another embodiment of the application, FIG. 5 is a schematic exploded view of the structure in FIG. 4, FIG. 6 is a schematic structural diagram of a first battery cell according to an embodiment of this application, FIG. 7 is a schematic exploded view of the structure in FIG. 6, and FIG. 8 is a schematic structural diagram of a second battery cell according to an embodiment of this application.

The battery column 11 can be disposed in various ways. In some embodiments, the battery column 11 includes a housing 300, and first battery cells 100 and second battery cells 200 that are alternately distributed side by side along a first direction (the X direction in FIG. 3) in the housing 300, where the first battery cell 100 includes a first metal case 110 and a first insulating film 120, the first metal case 110 has two first side surfaces 111 disposed opposite each other along the first direction, and the first insulating film 120 covers at least the two first side surfaces 111; and the second battery cell 200 includes a second metal case 210, which is exposed in the housing 300.

The direction in which the first battery cells 100 and the second battery cells 200 are disposed side by side in the battery column 11 is the first direction.

The first battery cells 100 and the second battery cells 200 are alternately arranged side by side, which means that individual first battery cells 100 and individual second battery cells 200 are alternately arranged side by side along the first direction. To be specific, one first battery cell 100 and one second battery cell 200 form a battery cell group, and two or more battery cell groups are arranged side by side along the first direction.

The second metal case 210 being exposed in the housing 300 means that no insulating film is coated on the second metal case 210, and the second battery cell 200 is in contact or connection with other components of the battery column 11 directly through the second metal case 210.

The battery column 11 of the embodiments of this application includes a housing 300, and first battery cells 100 and second battery cells 200 that are alternately distributed side by side in the housing 300. The first insulating film 120 is provided on the first metal case 110 of the first battery cell 100, and covers the first side surfaces 111. The second battery cell 200 includes the second metal case 210, which is exposed in the housing 300. The first insulating film 120 covers the two first side surfaces 111, ensuring mutual insulation between the first battery cell 100 and the second battery cell 200. The first battery cells 100 and the second battery cells 200 are alternately arranged side by side along the first direction, ensuring mutual insulation between all battery cells in the battery column 11. Therefore, in the battery column 11 according to the embodiments of this application, even if no insulating film is provided on the second metal case 210 of the second battery cell 200, and the second metal case 210 is exposed in the housing 300, the battery cells can still be insulated from each other, and space inside the housing 300 can be saved, thereby improving energy density of the battery column 11 and reducing costs.

The housing 300 can be disposed in various ways. In some embodiments, the housing 300 includes two end plates 310 disposed opposite each other along the first direction, the first battery cells 100 and the second battery cells 200 are disposed between the two end plates 310, and the end plate 310 is provided with an insulating plate 350 on a side facing toward an inner surface of the housing.

In these embodiments, the end plate 310 is provided with the insulating plate 350 on the side facing toward the inner surface of the housing, which can ensure mutual insulation between the end plate 310 and the first battery cell 100, and/or mutual insulation between the end plate 310 and the second battery cell 200.

When the second battery cell 200 is located at one end of a plurality of first battery cells 100 and second battery cells 200 that are arranged side by side, the second metal case 210 is in direct contact with the insulating plate 350, or is directly bonded to the insulating plate 350 by using glue.

In some embodiments, the housing 300 further includes a band 330 surrounding an outer circumference side of the two end plates 310, the first battery cells 100, and the second battery cells 200, and the band 330 is covered with an insulating layer.

In these embodiments, the band 330 is covered with an insulating layer to ensure mutual insulation between the band 330 and the first battery cell 100 and the second battery cell 200, and further ensure mutual insulation between the first battery cell 100, the second battery cell 200 and the housing 300.

In some other embodiments, the housing 300 further includes two side plates 320 disposed opposite each other along a second direction (the Y direction in FIG. 3), and the first battery cells 100 and the second battery cells 200 are disposed between the two side plates 320. The side plate 320 is provided with a second insulating film 321 on an inner surface facing toward an accommodating cavity, and the second metal case 210 is directly connected to the second insulating film 321.

In these embodiments, the side plate 320 is provided with the second insulating film 321 on the inner surface facing toward the housing, which ensures mutual insulation between the side plate 320 and the first battery cell 100 and the second battery cell 200, and further ensures mutual insulation between the first battery cell 100, the second battery cell 200 and the housing 300.

The two side plates 320 are separately connected between the two end plates 310, so that the two end plates 310 and the two side plates 320 are jointly enclosed to form an accommodating cavity for accommodating the first battery cells 100 and the second battery cells 200.

The second insulating film 321 can be disposed in various ways. For example, the second insulating film 321 may be an insulating film layer attached to the inner surface of the side plate 320, or the second insulating film 321 may be an adhesive layer coated on the inner surface of the side plate 320, provided that the second insulating film 321 can implement the mutual insulation between the side plate 320 and the first battery cell 100 and the second battery cell 200.

When the second insulating film 321 is an adhesive layer, the second metal case 210 may be directly bonded to the second insulating film 321. When the second insulating film 321 is an insulating film layer, the second metal case 210 may be in direct contact with the second insulating film 321, or the second metal case 210 may be directly bonded to the second insulating film 321 by using glue.

In still other embodiments, the housing 300 further includes a base plate 340, the base plate 340 is provided with a third insulating film 341 on an inner surface facing toward the housing, and the second metal case 210 is directly connected to the third insulating film 341.

In these embodiments, the base plate 340 is provided with the third insulating film 341 on the inner surface facing toward the housing, which can ensure mutual insulation between the base plate 340 and the first battery cell 100 and the second battery cell 200, and further ensure mutual insulation between the first battery cell 100, the second battery cell 200 and the housing 300.

The third insulating film 341 may be disposed in various ways. For example, the third insulating film 341 may be an insulating film layer attached to the inner surface of the base plate 340, or the third insulating film 341 may be an adhesive layer coated on the inner surface of the base plate 340, provided that the third insulating film 341 can implement the mutual insulation between the bottom plate 340 and the first battery cell 100 and the second battery cell 200.

When the third insulating film 341 is an adhesive layer, the second metal case 210 may be directly bonded to the third insulating film 341. When the third insulating film 341 is an insulating film layer, the second metal case 210 may be in direct contact with the third insulating film 341, or the second metal case 210 may be directly bonded to the third insulating film 341 by using glue.

The first battery cell 100 can be disposed in various ways. In some embodiments, the first battery cell 100 further includes a first electrode unit 130 located in the first metal case 110 and a first top cover assembly 140 covering an opening of the first metal case 110.

The second battery cell 200 can be disposed in various ways. In some embodiments, the second battery cell 200 further includes a second electrode unit 220 located in the second metal case 210 and a second top cover assembly 230 covering an opening of the second metal case 210.

The first electrode unit 130 and the second electrode unit 220 can be formed by stacking or winding a first electrode plate, a second electrode plate, and a separator located between the first electrode plate and the second electrode plate, where the separator is an insulator sandwiched between the first electrode plate and the second electrode plate.

In some embodiments, the first metal case 110 further includes two second side surfaces 112 disposed opposite each other along a second direction, where the two second side surfaces 112 are connected between the two first side surfaces 111. The first metal case 110 further includes a bottom surface 113 disposed opposite an opening thereof, and the bottom surface 113 is connected between the two first side surfaces 111.

The first insulating film 120 can be disposed in various ways. In some embodiments, the first insulating film 120 covers at least part of the second side surfaces 112.

The first insulating film 120 covers the second side surfaces 112 in various ways. In some embodiments, the first insulating film 120 further includes a first wrapping portion 122 that covers at least part of the second side surfaces 112. The first wrapping portion 122 can cover any suitable portion on the second side surfaces 112. For example, the first insulating film 120 includes a body portion 121 covering the first side surface 111, and the first wrapping portion 122 extends from the body portion 121 to the second side surface 112, that is, the first wrapping portion 122 extends from the first side surface 111 to the second side surface 112, and an extension width of the first wrapping portion 122 in the first direction is 5 mm to 10 mm.

In these embodiments, a width of the first wrapping portion 122 is 5 mm to 10 mm, which can meet the safe creepage distance requirements.

One, two, or more first wrapping portions 122 can be provided. In some embodiments, four first wrapping portions 122 are provided, with the two first wrapping portions 122 spaced apart along the first direction on each second side surface 112.

In some other embodiments, the first insulating film 120 further covers at least part of the bottom surface 113.

The first insulating film 120 covers the bottom surface 113 in various ways. In some embodiments, the first insulating film 120 further includes a second wrapping portion 123 that covers at least part of the bottom surface 113. The second wrapping portion 123 can cover any suitable position on the bottom surface 113. For example, the second wrapping portion 123 extends from the body portion 121 to the bottom surface 113, that is, the second wrapping portion 123 extends from the first side surface 111 to the bottom surface 113, and an extension width of the second wrapping portion 123 in the first direction is 5 mm to 10 mm. In this way, the first insulating film 120 can meet the creepage distance requirements on the bottom surface 113.

One or two second wrapping portions 123 can be provided. For example, two second wrapping portions 123 are provided, which are spaced apart on the bottom surface 113 along the first direction.

The first insulating film 120 can be made of any suitable material. For example, the first insulating film 120 is made of a material selected from at least one of low density polyethylene (LDPE), high density polyethylene (HDPE), polypropylene (PP), polyethylene (PE), polyethylene terephthalate (PET), polycarbonate (PC), and polyarylate. In some embodiments, the first insulating film 120 is made of PET, so that the first insulating film 120 has good flexibility and can be wrapped on the first metal case 110.

The first insulating film 120 and the first metal case 110 can be connected in various ways. For example, the first insulating film 120 is wrapped on the first metal case 110 through thermal deformation. Alternatively, a surface of the first insulating film 120 facing toward the first metal case 110 is adhesive, allowing the first insulating film 120 to be bonded to the first metal case 110.

The first insulating film 120 and the second metal case 210 can be connected in various ways. For example, a glue is provided between the first insulating film 120 and the second metal case 210, so that the first insulating film 120 can be bonded to the second metal case 210 by using the glue, making relative positions of the first battery cells 100 and the second battery cells 200 stable. The glue can be made of any suitable material. For example, the glue can be made of at least one of polyethylene glue, epoxy resin, and hot melt adhesive.

In order to ensure that no heat transfer occurs between the first battery cell 100 and the second battery cell 200, in some embodiments, the battery column 11 further includes a heat insulation pad 400, where the heat insulation pad 400 is disposed between the first battery cell 100 and the second battery cell 200 that are adjacent to each other.

The heat insulation pad 400 and the first battery cell 100 and/or the second battery cell 200 can be connected in various ways. For example, the heat insulation pad 400 is bonded to the first battery cell 100 and/or the second battery cell 200 by using glue. To be specific, the heat insulation pad 400 and the first insulation film 120 are bonded to each other by using the glue, and/or the heat insulation pad 400 is directly bonded to the second metal case 210 by using the glue.

In some other embodiments, the heat insulation pad 400 is in contact with the first insulating film 120, and/or the heat insulation pad 400 is in direct contact with the second metal case 210.

The heat insulation pad 400 can be made of any suitable material. In some embodiments, the material for making the heat insulation pad 400 is selected from at least one of foam and asbestos, which not only meets the requirements of heat insulation, but also has a particular cushioning effect.

Figure 9:
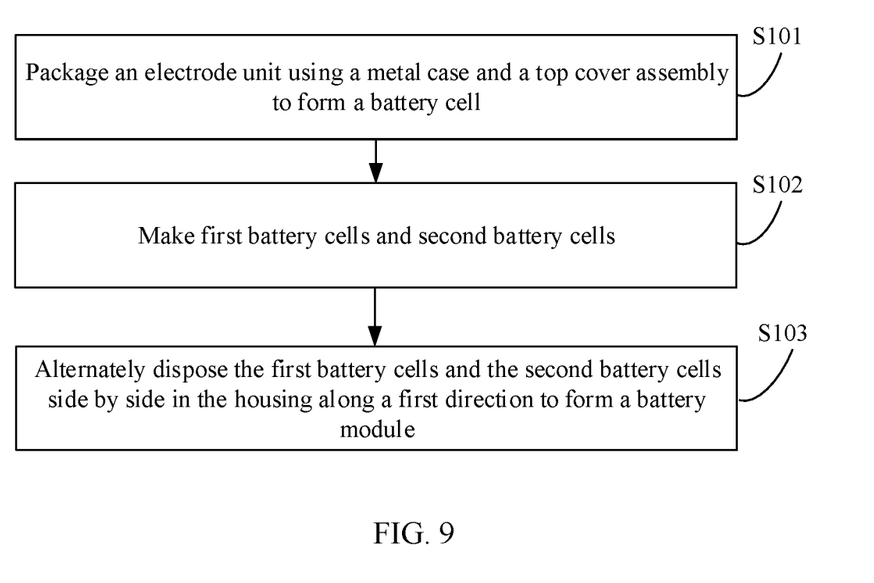
FIG. 9 is a flowchart of a method for forming a battery column according to an embodiment of this application.

Referring to FIG. 9, FIG. 9 is a flowchart of a method for forming a battery column according to an embodiment of this application. The battery column 11 is the battery column 11 according to any one of the foregoing embodiments. The method for forming the battery column 11 is described as follows.

Step S101: Package an electrode unit using a metal case and a top cover assembly to form a battery cell.

Step S102: Make first battery cells and second battery cells.

Step S102 can be implemented in various ways. For example, a plurality of battery cells are divided into two groups, of which one is wrapped with a first insulating film 120 on the metal case to form the first battery cell 100, where the first insulating film 120 covers at least two first side surfaces 111 of the metal case disposed opposite each other in a first direction, and the other serves as the second battery cell 200.

The first insulating film 120 can be disposed in various ways. For example, the first insulating film 120 further covers at least part of second side surfaces 112 of the metal case disposed opposite each other in a second direction, or the first insulating film 120 further covers at least part of a bottom surface 113 of the metal case.

Step S103: Alternately dispose the first battery cells and the second battery cells side by side in the housing along the first direction to form a battery column.

In the method for forming the battery column 11 according to this embodiment of this application, step S101 is first used to form a plurality of battery cells. Then step S102 is used to divide the plurality of battery cells into two groups, of which one is wrapped with the first insulating film 120 on the metal case to form the first battery cell 100, and the other serves as the second battery cell 200. In step S102, the second battery cell 200 does not need to be wrapped with an insulating film, thereby simplifying the production process and improving production efficiency. In addition, the first insulating film 120 covers at least the first side surfaces 111. After the first battery cells 100 and the second battery cells 200 form the battery column 11 in step S103, the battery cells can be insulated from each other, space in the housing 300 can be saved, thereby improving energy density of the battery column 11.

This application can be implemented in other specific forms without departing from its spirit and essential features. For example, the algorithm described in a specific embodiment can be modified while the system architecture does not depart from the basic spirit of this application. Therefore, the current embodiments are regarded as illustrative rather than limitative in all aspects, and the scope of this application is defined by the appended claims rather than the foregoing description, and all changes falling within the meaning of the claims and their equivalents are thus included within the scope of this application.

The invention claimed is:

1. A battery column, comprising: a housing, and a plurality of first battery cells and a plurality of second battery cells that are alternately distributed side by side along a first direction in the housing,
    wherein each first battery cell comprises a first metal case and a first insulating film, the first metal case has two first side surfaces disposed opposite each other along the first direction, and the first insulating film covers at least the two first side surfaces;
    each second battery cell comprises a second metal case, which is exposed in the housing; and
    the first metal case further comprises two second side surfaces disposed opposite each other along a second direction, the two second side surfaces are connected between the two first side surfaces, and the first insulating film covers at least part of the two second side surfaces.

2. The battery column according to claim 1, wherein the first metal case further comprises a bottom surface connected between the two first side surfaces, and the first insulating film covers at least part of the bottom surface.

3. The battery column according to claim 1, wherein the first insulating film is made of a material selected from at least one of low density polyethylene, high density polyethylene, polypropylene, polyethylene, polyethylene terephthalate, polycarbonate, and polyarylate.

4. The battery column according to claim 1, wherein the second metal case and the first insulating film are directly bonded by using glue.

5. The battery column according to claim 1, further comprising a heat insulation pad, wherein the heat insulation pad is disposed between adjacent first and second battery cells;
    the heat insulation pad is directly bonded to the second metal case by using glue; or the heat insulation pad is in direct contact with the second metal case.

6. The battery column according to claim 1, wherein the housing comprises two side plates disposed opposite each other along a second direction, the second direction intersects the first direction, the plurality of first battery cells and the plurality of second battery cells are disposed between the two side plates, each of the two side plate are provided with a second insulating film on an inner surface facing toward the housing, the second insulating film is an insulating film layer attached to the inner surface of each one of the two side plates, or an adhesive layer coated on the inner surface of each one of the two side plates; and
the second metal case is directly connected to the second insulating film.

7. The battery column according to claim 1, wherein the housing comprises a base plate, and the base plate is provided with a third insulating film on an inner surface facing toward the housing, wherein the third insulating film is an insulating film layer attached to the inner surface of the base plate, or an adhesive layer coated on the inner surface of the base plate; and
the second metal case is directly connected to the third insulating film.

8. A battery module, comprising at least one battery column, wherein the battery column comprises: a housing, a plurality of first battery cells and a plurality of second battery cells that are alternately distributed side by side along a first direction in the housing, and a heat insulation pad,
wherein each first battery cell comprises a first metal case and a first insulating film, the first metal case has two first side surfaces disposed opposite each other along the first direction, and the first insulating film covers at least the two first side surfaces;
each second battery cell comprises a second metal case, which is exposed in the housing; and
the heat insulation pad is disposed between adjacent first and second battery cells;
the heat insulation pad is directly bonded to the second metal case by using glue; or
the heat insulation pad is in direct contact with the second metal case.

9. An apparatus using a battery column as a power source, wherein the battery column comprises: a housing, and a plurality of first battery cells and a plurality of second battery cells that are alternately distributed side by side along a first direction in the housing,
wherein each first battery cell comprises a first metal case and a first insulating film, the first metal case has two first side surfaces disposed opposite each other along the first direction, and the first insulating film covers at least the two first side surfaces;
each second battery cell comprises a second metal case, which is exposed in the housing; and
the housing comprises a base plate, and the base plate is provided with a third insulating film on an inner surface facing toward the housing, wherein the third insulating film is an insulating film layer attached to the inner surface of the base plate, or an adhesive layer coated on the inner surface of the base plate; and
the second metal case is directly connected to the third insulating film.

10. The battery column according to claim 1, wherein the first metal case further comprises a bottom surface connected between the two first side surfaces, and the first insulating film covers at least part of the bottom surface.

11. The battery module according to claim 8, wherein the first metal case further comprises two second side surfaces disposed opposite each other along a second direction, the two second side surfaces are connected between the two first side surfaces, and the first insulating film covers at least part of the two second side surfaces.

12. The battery module according to claim 8, wherein the first metal case further comprises a bottom surface connected between the two first side surfaces, and the first insulating film covers at least part of the bottom surface.

13. The battery module according to claim 11, wherein the first metal case further comprises a bottom surface connected between the two first side surfaces, and the first insulating film covers at least part of the bottom surface.

14. The battery module according to claim 8, wherein the first insulating film is made of a material selected from at least one of low density polyethylene, high density polyethylene, polypropylene, polyethylene, polyethylene terephthalate, polycarbonate, and polyarylate.

15. The battery module according to claim 8, wherein the second metal case and the first insulating film are directly bonded by using glue.

16. The battery module according to claim 8, wherein the housing comprises two side plates disposed opposite each other along a second direction, the second direction intersects the first direction, the plurality of first battery cells and the plurality of second battery cells are disposed between the two side plates, each of the two side plate are provided with a second insulating film on an inner surface facing toward the housing, the second insulating film is an insulating film layer attached to the inner surface of each one of the two side plates, or an adhesive layer coated on the inner surface of each one of the two side plates; and
the second metal case is directly connected to the second insulating film.

17. The battery module according to claim 8, wherein the housing comprises a base plate, and the base plate is provided with a third insulating film on an inner surface facing toward the housing, wherein the third insulating film is an insulating film layer attached to the inner surface of the base plate, or an adhesive layer coated on the inner surface of the base plate; and
the second metal case is directly connected to the third insulating film.

18. The apparatus to claim 9, wherein the first metal case further comprises two second side surfaces disposed opposite each other along a second direction, the two second side surfaces are connected between the two first side surfaces, and the first insulating film covers at least part of the two second side surfaces.

19. The apparatus to claim 9, wherein the battery column further comprises a heat insulation pad, wherein the heat insulation pad is disposed between adjacent first and second battery cells;
the heat insulation pad is directly bonded to the second metal case by using glue; or
the heat insulation pad is in direct contact with the second metal case.

* * * * *